United States Patent [19]

Iwatsuki et al.

[11] Patent Number: 5,319,998

[45] Date of Patent: Jun. 14, 1994

[54] METHOD FOR DOWNSHIFTING OF AUTOMATIC TRANSMISSION WITH DISCRIMINATION OF MAGNITUDE OF NEED THEREFOR

[75] Inventors: Kunihiro Iwatsuki; Hideaki Ootsubo; Hiromichi Kimura, all of Toyota, Japan

[73] Assignee: Toyota Jidosha Kabushiki Kaisha, Toyota, Japan

[21] Appl. No.: 792,920

[22] Filed: Nov. 15, 1991

[30] Foreign Application Priority Data

Nov. 15, 1990 [JP] Japan .................. 2-309054

[51] Int. Cl.⁵ .............................. B60K 41/16
[52] U.S. Cl. .................. 477/149; 364/424.1; 477/144; 477/905
[58] Field of Search .............. 74/866; 364/424.1

[56] References Cited

U.S. PATENT DOCUMENTS

| | | |
|---|---|---|
| 4,495,576 | 1/1985 | Ito . |
| 4,658,676 | 4/1987 | Furusawa et al. ............. 74/866 O R |
| 4,730,519 | 3/1988 | Nakamura et al. ........... 74/866 O R |
| 4,733,580 | 3/1988 | Kubo et al. . |
| 5,016,495 | 5/1991 | Takizawa ...................... 74/866 O R |
| 5,038,287 | 8/1991 | Taniguchi et al. ............. 74/866 X |
| 5,161,432 | 11/1992 | Matsumoto et al. ......... 74/866 O R |

FOREIGN PATENT DOCUMENTS

| | | |
|---|---|---|
| 58-30558 | 2/1983 | Japan . |
| 60-34561 | 2/1985 | Japan . |
| 60-34562 | 2/1985 | Japan . |
| 62-88857 | 4/1987 | Japan . |
| 62-88859 | 4/1987 | Japan . |
| 62-177346 | 8/1987 | Japan . |

*Primary Examiner*—Leslie A. Braun
*Assistant Examiner*—Daniel Wittels
*Attorney, Agent, or Firm*—Oblon, Spivak, McClelland, Maier & Neustadt

[57] ABSTRACT

In a method for downshifting of an automatic transmission of a vehicle according to an increase of throttle opening, a delay time between a judgement of a requirement of downshifting of the transmission and the execution of the downshifting is determined to base upon change rate of the throttle opening, and when the delay time was counted up, a requirement of downshifting of the transmission is again judged before the execution of any downshifting.

4 Claims, 4 Drawing Sheets

METHOD FOR DOWNSHIFTING OF AUTOMATIC TRANSMISSION WITH DISCRIMINATION OF MAGNITUDE OF NEED THEREFOR

BACKGROUND OF THE INVENTION

1. Field of the Invention

The present invention relates generally to the speed stage control of an automatic transmission of a vehicle such as an automobile, and more particularly, to a method for a downshifting of an automatic transmission of a vehicle such as an automobile according to a depression of the accelerator pedal, i.e., an increase of throttle opening.

2. Description of the Prior Art

An automatic transmission of a vehicle such as an automobile operates to provide various speed stages generally according to a relation in magnitude between the throttle opening representing the driver's requirement for the power performance of the vehicle and the vehicle speed which responds to the throttle opening in relation to other conditions concerned with running of the vehicle. When the vehicle is running at a relatively high speed with the automatic transmission shifted to a high speed stage (i.e. a speed stage having a low reduction gear ratio), if the accelerator pedal is more depressed at a relatively high rate for more than a certain relatively large amount, the control section of the automatic transmission, particularly an electronic computing section in the modern automatic transmission equipped with an electronic control system, judges a requirement of downshifting of the automatic transmission before the vehicle speed increases in accordance with the increase of engine output power due to the increased depression of the accelerator pedal. It is desirable from the view point of a high controllability of the automatic transmission that the control section responds to the driver's requirement immediately in executing the judged requirement of downshifting. However, if a downshifting from a certain first speed stage to a next lower speed stage is started immediately when the amount of depression of the accelerator pedal has exceeded a value for which the requirement of downshifting for one speed stage is judged, if the depression of the accelerator pedal further proceeds so much that its increase exceeds a second value for which a requirement of downshifting for one more speed stage is judged, a complicated disturbance can occur in the movement of mechanically and hydraulically operating friction engaging means such as clutches and brakes for changing over the speed stages of the transmission.

In consideration of such problems, it has been proposed in Japanese Patent Laid-open Publication 58-30558 to provide a certain predetermined delay time between the moment of judgement of a requirement of downshifting and the execution of the downshifting. In this prior art, the predetermined delay time is a constant time span.

In Japanese Patent Laid-open Publication 62-177346 it has been proposed to provide a delay time between the moment of judgement of a requirement of downshifting from a certain first speed stage to a certain second speed stage, and when a different judgement for a requirement of downshifting from said certain first speed stage to a certain third speed stage different from said second speed stage is made within the delay time, the delay time is changed to be adapted to the downshifting according to the second judgement.

In such an art of taking a delay time between the moment of judgement of a requirement of downshifting and the execution of the downshifting, it is the essential problem how to determine the time span of the delay time. From the view point of quick responsiveness of the automatic transmission it is desired that the delay time is as short as possible, whereas, from the view point of avoiding a virtually useless temporal speed stage shifting of the automatic transmission it is desired that the delay time is relatively long so that the requirement for the speed stage shifting is infallibly confirmed. These two requirements are thus contradictory to one another, and therefore, it is still outstanding for any improvements to provide a better reconciliation between these two requirements.

SUMMARY OF THE INVENTION

In view of the above-mentioned problems with respect to the timing relation between the moment of judgement of a requirement of downshifting and the execution of the downshifting in the automatic transmission, it is the object of the present invention to provide an improved method for downshifting of an automatic transmission of a vehicle such as an automobile which harmonizes the quick responsiveness in the speed stage shifting of the automatic transmission more desirably with a high accuracy in confirming the final requirement for the speed stage shifting.

According to the present invention, the above-mentioned object is accomplished by a method for downshifting of an automatic transmission of a vehicle according to an increase of throttle opening, comprising the steps of:

judging a requirement of downshifting of the transmission;

starting time count for a delay time upon said judgement;

calculating a value for said delay time based upon change rate of the throttle opening;

judging again a requirement of downshifting of the transmission upon the count up of said delay time; and executing the downshifting according to the secondly judged requirement when the requirement exists.

When a downshifting of the automatic transmission is judged for a certain amount of increase of the throttle opening, the time required for the throttle opening to traverse such an increase is shorter as the change rate of the throttle opening is greater. Therefore, when the delay time between the moment of judgement of a requirement of downshifting and the execution of the downshifting is determined to base upon the change rate of the throttle opening, the delay time can be determined to be a necessary minimum to confirm whether more than one speed stage downshifting is required or not by the current depression of the accelerator pedal for a wide variety of manner of depression of the accelerator pedal. Therefore, by judging again a requirement of downshifting with the lapse of such a delay time from the moment of the first judgement of a requirement of downshifting, the final requirement for the downshifting is infallibly confirmed, with such a minimum time delay from the moment of starting the depression of the accelerator pedal that is shorter as more quickly the accelerator pedal is depressed.

The delay to base upon the change rate of throttle opening time may be calculated to base upon a time span which would lapse for the throttle opening to increase up to a value for which a requirement of downshifting of the transmission for two speed stages is judged, provided that the throttle opening increases linearly.

In this case, the delay time may be modified for an increase when the change rate of throttle opening becomes negative before the delay time is count up.

The method for downshifting according to the present invention is particularly suited to an automatic transmission which comprises first and second speed change gear units connected in series, said first and second speed change gear units selectively providing high and low gear stages thereof, respectively, so that a first speed stage is provided by a series combination of the high gear stage of said first speed change gear unit and the high gear stage of said second speed change gear unit, a second speed stage next lower than said first speed stage is provided by a series combinations of the low gear stage of said first speed change gear unit and the high gear stage of said second speed change gear unit, and a third speed stage next lower than said second speed stage is provided by a series combination of the high gear stage of said first speed change gear unit and the low gear stage of said second speed change gear unit.

BRIEF DESCRIPTION OF THE DRAWINGS

In the accompanying drawings.

DESCRIPTION OF THE PREFERRED EMBODIMENT

In the following the present invention will be described in more detail with respect to a preferred embodiment with reference to the accompanying drawings.

Figure 1:
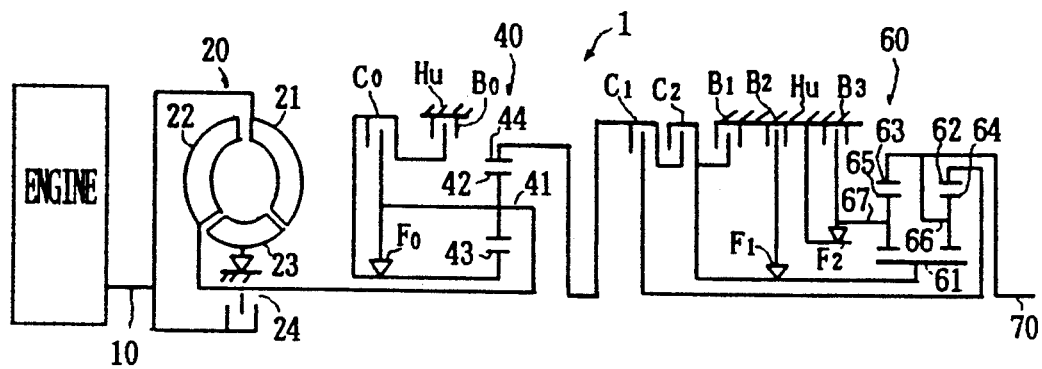
FIG. 1 is a diagrammatical illustration of a power system of a vehicle such as an automobile including an automatic transmission having a gear train composed of a series connection of first and second speed change gear units.

Referring to FIG. 1 illustrating diagrammatically an automatic transmission of a vehicle to which the transmission control method according to the present invention may be applied, the transmission generally designated by reference numeral 1 comprises a torque converter 20 of a conventional type having a pump 21 connected with an engine via an input shaft 10, a turbine 22 and a stator 23, a lock-up clutch 24 for selectively directly connecting the pump 21 with the turbine 22, a first gear unit 40 including a planetary gear mechanism having a sun gear 43, a ring gear 44, a planetary pinion 42 and a carrier 41 connected with the turbine 22 of the torque converter 20, a clutch $C_0$ for selectively connecting the sun gear 43 with the carrier 41, a brake $B_0$ for selectively braking the sun gear 43 relative to a housing Hu and a one way clutch $F_0$ for torque transmittingly connecting the sun gear 43 with the carrier 41 only in one rotational direction, and a second gear unit 60 including a first planetary gear mechanism having a sun gear 61, a ring 62, a planetary pinion 64 and a carrier 66, a second planetary gear mechanism having a sun gear common with the sun gear 61 of the first planetary gear mechanism, a ring gear 63, a planetary pinion 65 an a carrier 67, a clutch $C_1$ for selectively connecting the ring gear 62 with the ring gear 44 of the first gear unit 40, a clutch $C_2$ for selectively connecting the sun gears 61 with the ring gear 44 of the first gear unit 40, a brake $B_1$ for selectively braking the sun gears 61 relative to the housing Hu, a series combination of a brake $B_2$ and a one way clutch $F_1$ for selectively braking the sun gears 61 only in one rotational direction when the brake $B_2$ is engaged, a brake $B_3$ for selectively braking the carrier 67 relative to the housing Hu, and a one way clutch $F_2$ for braking the carrier 67 relative to the housing Hu only in one rotational direction, wherein the carrier 66 and the ring gear 63 are connected with one another to serve as an output shaft of the transmission.

Figure 2:
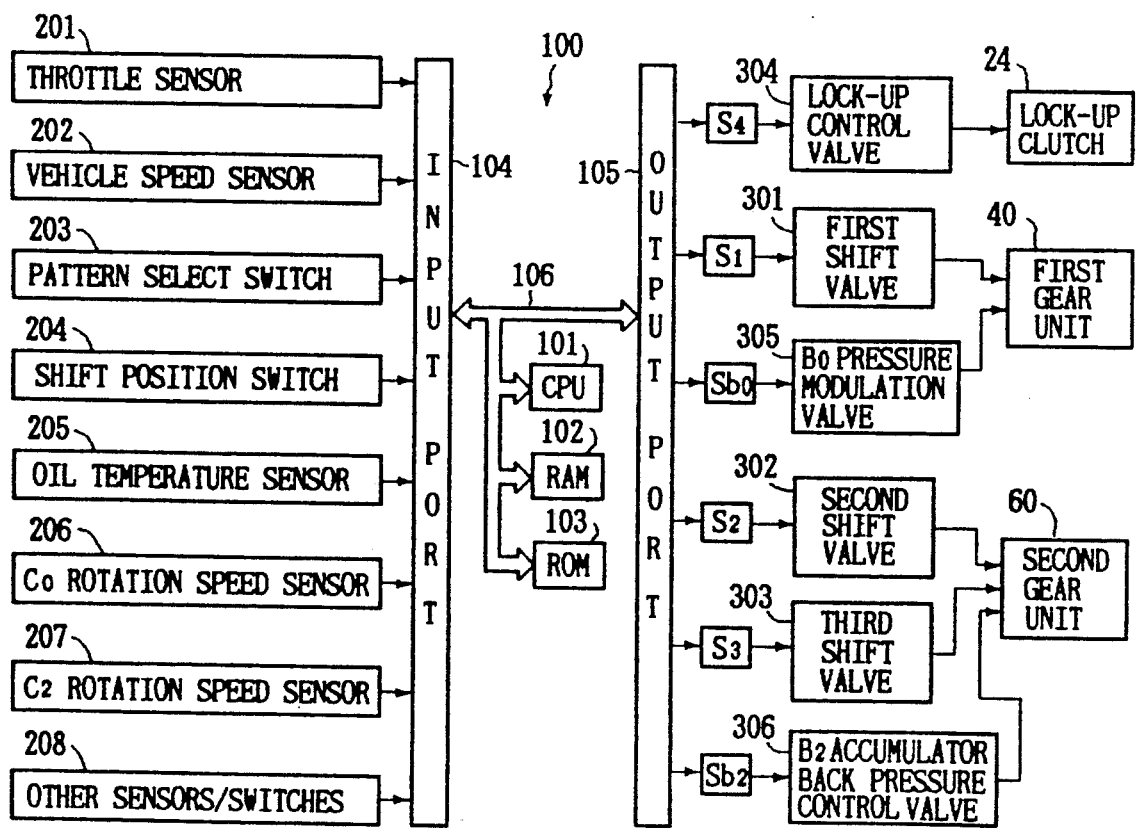
FIG. 2 is a diagrammatical illustration of a control system for changing over the gear train shown in FIG. 1 for various speed stages.

The clutches $C_0$, $C_1$ and $C_2$ and the brakes $B_0$, $B_1$, $B_2$ and $B_3$ may be hydraulically operated to be engaged or disengage by a electrohydraulic control system the general concept of which is well known in the art in such a manner that solenoid-operated change-over valves change over supply and exhaust of hydraulic pressure to and from the respective clutches and brakes under the control of an electronic control unit. FIG. 2 shows, in a diagrammatical illustration, an electrohydraulic control system which controls the speed stage changeover operation of the transmission shown in FIG. 1.

The tandem connection of the first gear unit 40 and the second gear unit 60 can be controlled according to the conventional method to provide four forward speed stages by the second gear unit 60 being changed over between three different gear ratios while the first gear unit 40 is maintained in its lower gear stage so that the 1st, 2nd and 3rd speed stages are provided, and then by the first gear unit 40 being changed over to its higher gear stage while the second gear unit 60is maintained at the 3rd speed stage so that the 4th speed stage is provided as an overdrive stage. (Of course a reverse stage is also provided, as well known in the art.) However, the tandem connection of the first gear unit 40 and the second gear unit 60 shown in FIG. 1 is herein controlled by the electro-hydraulic control unit shown in FIG. 2 so as to provide six forward speed stages by on and off combinations of the clutches $C_0$-$C_2$, the brakes $B_0$-$B_3$ and the one way clutches $F_1$-$F_2$ as shown in Table 1:

TABLE 1

| Range | Speed | C0 | B0 | C1 | C2 | B1 | B2 | B3 | F0 | F1 | F2 |
|---|---|---|---|---|---|---|---|---|---|---|---|
| R | — | o | | | o | | | o | o | | |
| D | 1st | o | | o | | | | | o | | o |
| D | 2nd | | o | o | | | | | | | o |
| D | 3rd | o | | o | | | o | | o | o | |
| D | 4th | | o | o | | | o | | | o | |
| D | 5th | o | | o | o | | o | | o | | |
| D | 6th | | o | o | o | o | | | | | |
| 2 | 1st | o | | o | | | | | o | | o |
| 2 | 2nd | | o | o | | | o | | | | o |
| L | 1st | o | | o | | | | o | o | | o |

In the above table, "o" indicates that the clutch, brake or one way clutch is engaged at the corresponding speed stage under the corresponding shift range.

As will be noted in the above table, the first gear unit 40 is changed over from the lower gear stage having a larger reduction gear ratio to the higher gear stage having a smaller reduction gear ratio in the upshifting from the 1st to the 2nd speed stage, from the 3rd to the 4th speed stage and from the 5th to the 6th speed stage, while it is changed over from the higher gear stage to the lower gear stage in the upshifting from the 2nd to the 3rd speed stage and from the 4th to the 5th speed stage.

Referring to FIG. 2, the electro-hydraulic control system comprises an electronic control unit 100 which is now available in various standards in the art as a hardware generally including a central processing unit (CPU) 101, a random access memory (RAM) 102, a read only memory (ROM) 103, an input port means 104, an output port means 105 and a common bus means 106 interconnecting these components.

The electronic control unit 100 is supplied with various data through the input port means 104 such as throttle opening from a throttle sensor 201, vehicle speed from a vehicle speed sensor 202, patterns of driving such as the economy pattern putting preference on the economical performance of the vehicle and the power pattern putting preference on the power performance of the vehicle from a pattern select switch 203, shift positions such as the R, N, D, 2 and L set by a manual lever from a shift position switch 204, oil temperature from an oil temperature sensor 205, rotational speed of an outer drum of the clutch $C_o$ from a $C_0$ rotation speed sensor 106, rotational speed of an outer drum of the clutch $C_2$ from a $C_2$ rotation speed sensor 207 and other data from other sensors and/or switches or the like generally designated by 208.

In the electronic control unit 100, the CPU 101 conducts calculations based upon the data received from said sensors and/or switches and the programs stored in the ROM 103 in corporation of the RAM 102, and outputs control signals to a hydraulic control means including various standard components not shown in the figure and particularly the following components:

$S_1$ is a solenoid valve which controls according to on and off thereof changing-over of a first shift valve 301 which controls supply and exhaust of oil pressure to and from the clutch $C_0$ and the Brake $B_0$ of the first gear unit 40.

$S_2$ and $S_3$ are solenoid valves which control according to on and off thereof changing-over of a second shift valve 302 and a third shift valve 303 which control supply and exhaust of oil pressure to and from the clutches $C_1$ and $C_2$ and the brakes $B_1$, $B_2$ and $B_3$ of the second gear unit 60.

$S_4$ is a solenoid valve which controls according to on and off thereof change-over of a lock-up control valve 304 which controls supply and exhaust of oil pressure to and from the lock-up clutch 24.

$Sb_0$ is a solenoid valve which controls according to periodical on and off thereof an opening of a $B_0$ pressure modulation valve 305 which controls oil pressure in the brake $B_0$ so that the pressure in the brake $B_0$ is continually changed according to the duty ratio of the on and off of the solenoid valve $Sb_0$.

$Sb_2$ is a solenoid valve which controls according to periodical on and off thereof an opening of a $B_2$ accumulator back pressure control valve 306 which controls back pressure in an accumulator for the brake $B_2$ so that the speed of progress of engagement or disengagement of the brake $B_2$ is continually changed according to the duty ratio of the on and off of the solenoid valve $Sb_2$.

Figure 3:
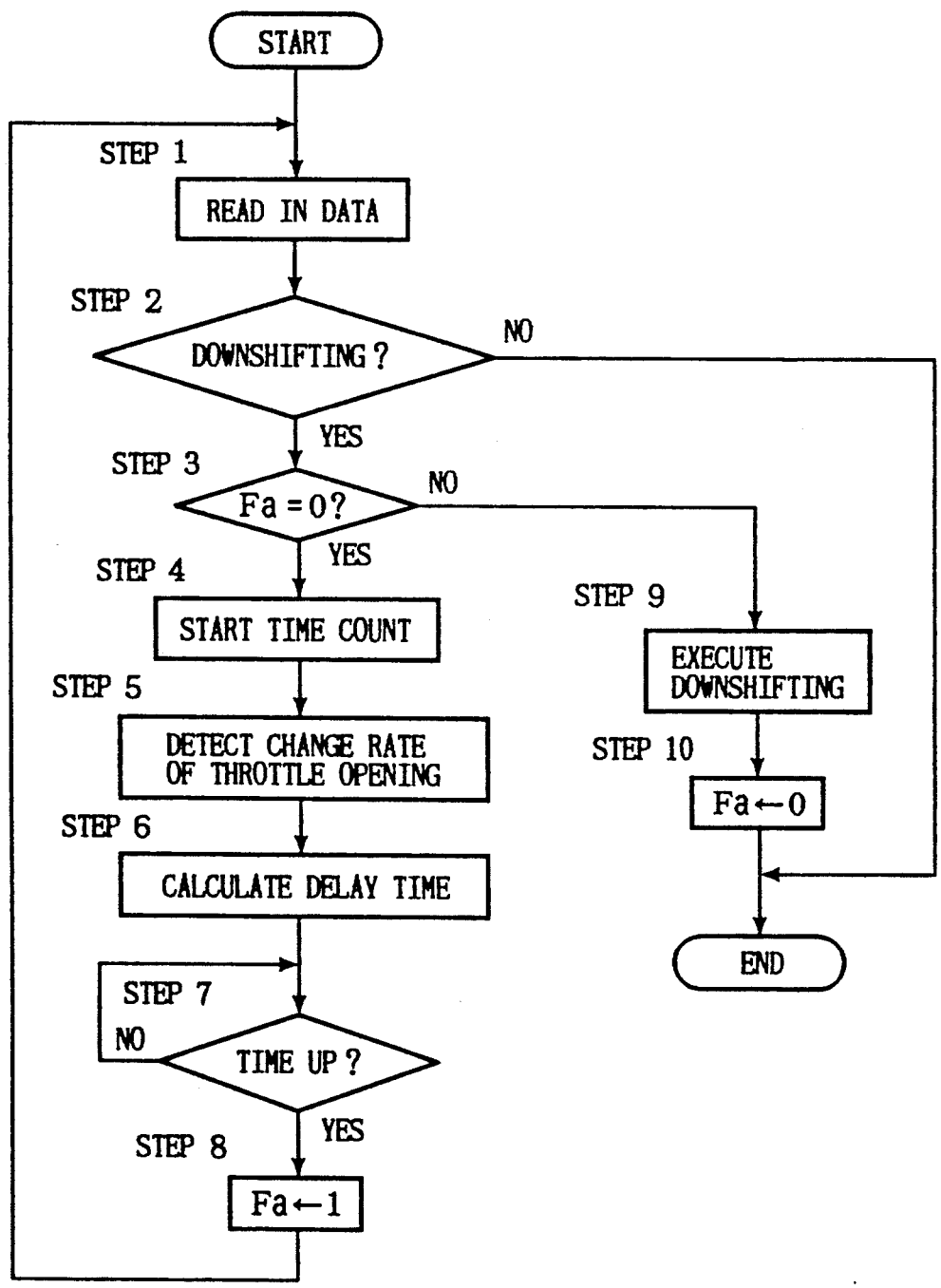
FIG. 3 is a flowchart illustrating a control process carried out according to the present invention.

The method for downshifting of an automatic transmission according to the present invention will be described in the form of a flowchart with reference to FIG. 3. The control process according to this flowchart is carried out in the electronic control unit 100.

When the control program was started, in step 1, data with regard to throttle opening, vehicle speed, etc. are read in from the throttle sensor 201, the vehicle speed sensor 202, etc. in the control system shown in FIG. 2. Then the control process proceeds to step 2.

In step 2, based upon the data read in in Step 1, it is judged if any downshifting is required. If no downshifting is required, the control program is finished with no substantial operation. If any downshifting is required, the control process proceeds to step 3.

In step 3, it is judged if a flag Fa is zero or not. Since the flag Fa is initialized to zero before the start of the control program, in the first pass to step 3, the answer is always yes. Therefore, the control process proceeds to step 4.

In step 4, a time count is started, and then the control process proceeds to step 5.

In step 5, change rate of throttle opening on time basis is detected. The change rate of throttle opening is the value thereof at the time when the requirement of downshifting was judged in step 2.

Figure 4:
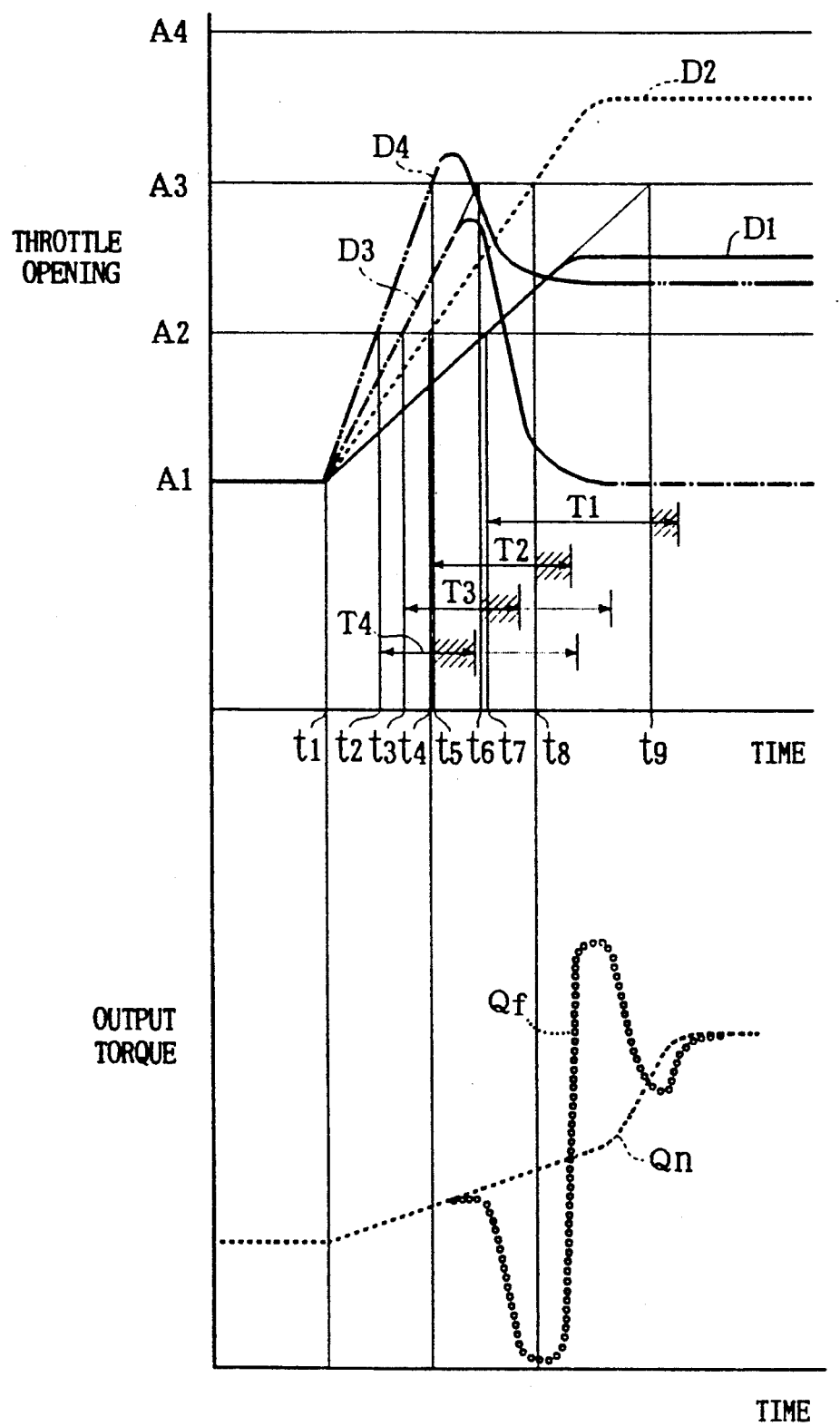
FIG. 4 is a graph showing typical performances of the throttle opening and the output torque in a downshifting of the automatic transmission according to the present invention.

In step 6, a delay time is calculated based upon the change rate of throttle opening detected in step 5 in the following manner:

Referring here to FIG. 4, there are shown four typical examples of the manner of depression of the accelerator pedal by the driver as changes of the throttle opening on a time basis. A solid line noted D1 shows a case in which the accelerator pedal is depressed at a relatively small constant change rate as started at a time point t1 so that the throttle opening linearly increases from an initial value A1 so as to traverse, at a time point t7, a value A2 for which the electronic control unit 100 judges a requirement of downshifting from a certain current high speed stage to a next lower speed stage, and to stop its increase at a value between the A2 and a next higher value A3 for which the electronic control unit 100 judges a requirement of downshifting further to a next lower speed stage. The constant change rate of throttle opening of the case D1 is such that the throttle opening would reach the value A3 if the increase continued up to a time point t9. The delay time calculated in step 6 is a time span T1 which extends between the time point at which the linearly increasing throttle opening traverses the value A2, i.e. t7, and a certain time point slightly later than the time point at which the linearly increasing throttle opening further traverses the value A3, i.e. t9. Other cases noted D2-will be described later. Coming back to FIG. 3, after step 6, the control process proceeds to step 7.

In step 7, it is judged if the time count started in step 4 has counted up the delay time calculated in the preceding step 6. After the start of the control program, for the time being the answer will be no. Therefore, for the time being the control process recirculates around step 7.

When the delay time T1 has lapsed from the time point t7, the answer to the judgement in step 7 turns to yes, and then the control process proceeds to step 8.

In step 8, the flag Fa is changed to 1. Then the control process returns to step 1.

In this second pass, in step 1, the data are again read in, and then in step 2 it is again judged if any downshifting is required. If the condition for the downshifting judged in the first pass to step 2 has been dissolved in the meantime, as the case D3 described in detail later, the control program is ended with no execution of downshifting. If any requirement of downshifting is judge in step 2, the control process proceeds again to step 3. Since the flag Fa is now set to 1, the control process proceeds to step 9, and the downshifting is executed according to the judgement finally made in step 2. Then the control process proceeds to step 10, and the flag Fa is initialized to zero, before the control program is ended.

Referring again to FIG. 4, other typical examples of the manner of the accelerator pedal depression will be described. A broken line noted D2 shows a case in which the accelerator pedal is depressed at a relatively high constant change rate, starting at the time point t1 so that the throttle opening increases from the value A1 to traverse the value A2 at a time point t4, and further to traverse, at a time point t8, the value A3, and thereafter to stop its increase at a value between A3 and a further higher value A4 for which the electronic control unit 100 will judge a requirement of one more stage downshifting. When the change rate of throttle opening is higher as it is so in the case D2 than in the case D1, the time span between a first time point at which the linearly increasing throttle opening traverses a first threshold value for a requirement of a first downshifting and a second time point at which the linearly increasing throttle opening traverses a further higher second threshold value for a requirement of a second downshifting is shorter, as t4 to t8 is shorter than t7 to t9. Therefore, the delay time T2 may be calculated to be substantially shorter than T1, still ensuring the same reliability in the judgement with regard to whether a one speed stage downshifting or a two speed stage downshifting is required.

In the case D2, when the control process returned to step 1 through steps 7 and 8, the date newly read in in step 1 include the value of throttle opening positioned between A3 and A4. Therefore, in the next step 2, a requirement of downshifting by two speed stages is judged. Therefore, in the next step 9, the transmission is directly shifted down by two speed stages.

Figure 5:
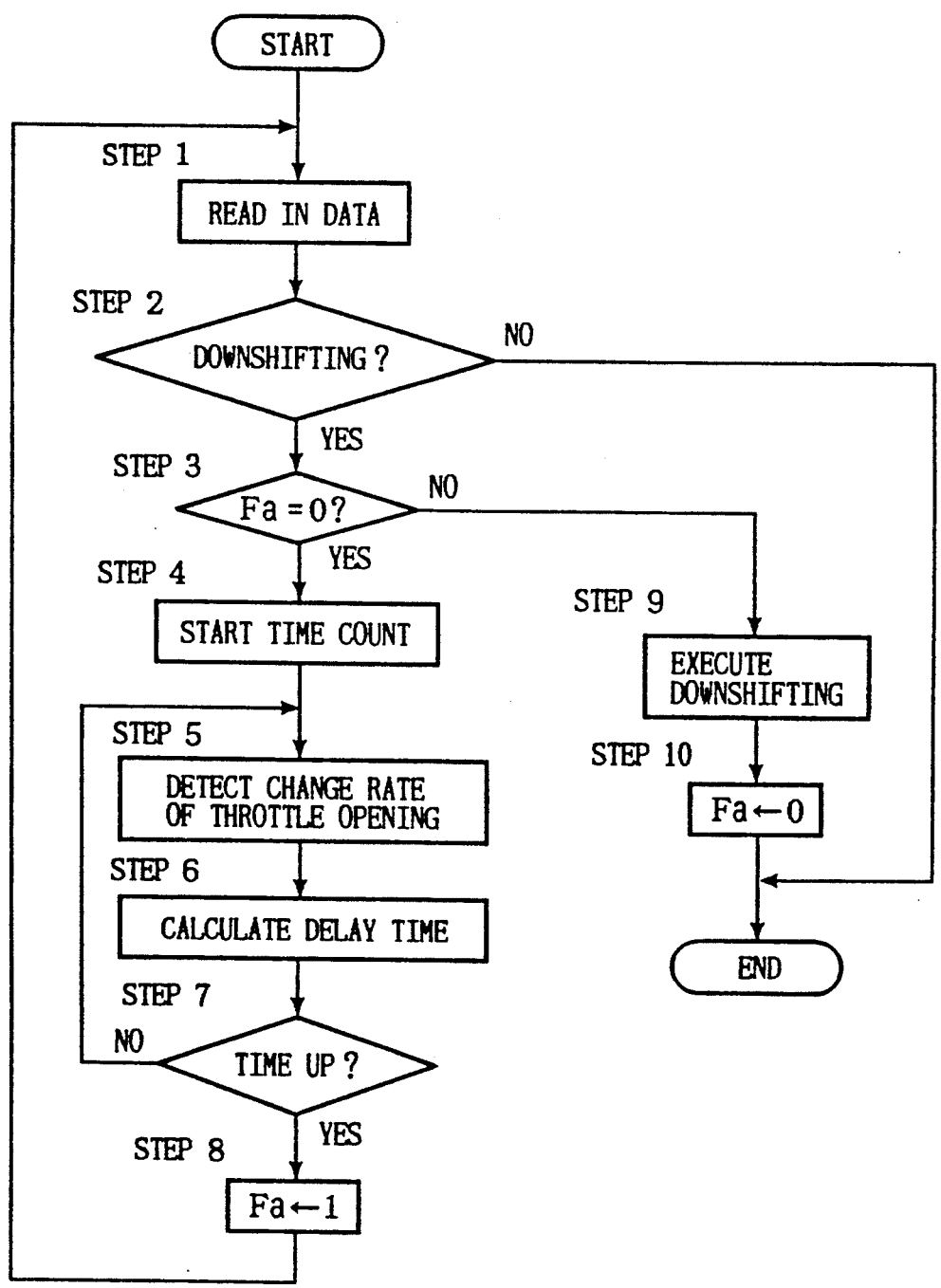
FIG. 5 is a flowchart illustrating a modification of the control process shown in FIG. 3.

A dot dash line in FIG. 4 noted D3 shows a case in which the accelerator pedal is quickly depressed so that the throttle opening once traverses the value A2 but is returned immediately thereafter toward the starting value A1. In order to meet with such a percussive depression of the accelerator pedal, a modification of the control process as shown in FIG. 5 is effective. In the flowchart of FIG. 5, similar to that of FIG. 3 except the following, the control process returns from step 7 to step 5 until the delay time is counted up, so that the delay time is repetitively renewed at each scanning cycle based upon the current change rate of throttle opening at each scanning cycle. Therefore, when the control is so programmed that, if the change rate of throttle opening changes to negative before the delay time calculated in the preceding scanning cycle is counted up, the delay time is increased as much as an appropriately scheduled amount, as shown by dot lines in FIG. 4 with respect to T3 and T4 about the cases D3 and D4, the final condition with respect to the requirement of downshifting is more definitely confirmed.

In the case D3, when the control process returned to step 1 through steps 5, 6, 7 and 8 after the lapse of the increased delay time T3 as available by the flowchart of FIG. 5, the throttle opening is restored below A2, and therefore, in the next step 2, no requirement of downshifting is judged. Thus, it is avoided that a useless downshifting operation is triggered by such a temporal and percussive depression of the accelerator pedal.

A two dot and dash line noted D4 shows a case in which the accelerator pedal is quickly and deeply depressed but immediately returned to a moderate depression. In this case, as will be understood from the above description with respect to the case D3, after the lapse of an appropriately increased delay time T4 the transmission is shifted down by one speed stage.

As is understood from Table 1, in the gear train shown in FIG. 1 a downshifting from the 6th speed stage to the 5th speed stage is accomplished by disengaging the brake $B_0$ while engaging the clutch $C_0$ in the first gear unit 40 so that the first gear unit is shifted down from its high gear stage (smaller reduction gear ratio) to its low gear stage (greater reduction gear ratio), while the change-over condition of the second gear unit 60 is maintained as unchanged. In downshifting the transmission from the 5th speed stage to the 4th speed stage, the clutch $C_0$ is disengaged while the brake $B_0$ is engaged so that the first gear unit 40 is shifted up from its low gear stage to its high gear stage, while the clutch $C_2$ is disengaged in the second gear unit 60 so that the second gear unit 60 is shifted down from its direct connection stage to its next lower gear stage. Therefore, if the transmission shown in FIG. 1 is shifted down from the 6th speed stage to the 4th speed stage by a direct two stage downshifting, no change-over operation is required for the first gear unit 40. On the other hand, if the transmission shown in FIG. 1 is first shifted down from the 6th speed stage to the 5th speed stage and then immediately, or before the completion of the downshifting from the 6th speed stage to the 5th speed stage, is further shifted down to the 4th speed stage, a quick total reversing of the engagement and disengagement of the clutch $C_0$ and the brake $B_0$ occurs in the first gear unit 40.

Therefore, when, for example, the throttle opening changes as shown by the broken line in FIG. 4 (case D2), if the execution of the downshifting from the 6th speed stage to the 5th speed stage is started in response to the traversing of the throttle opening across the value A2, and then the execution of the downshifting from the 5th speed stage to the 4th speed stage is started in response to the traversing of the throttle opening across the value A3, the output torque will fluctuate to a great extend as shown by a beads line Qf in FIG. 4. By contrast, when the downshifting from the 6th speed stage to the 4th speed stage is directly executed with the time delay T2 as described above, the downshifting is accomplished only by disengaging the clutch $C_2$ so that one way clutch F1 is automatically engaged in the last stage of a gradual disengagement of the clutch $C_2$, the output torque will smoothly change as shown by a broken line Qn.

Although the invention has been described in detail with respect to a preferred embodiment thereof, it will be apparent to those skilled in the art that various modifications are possible without departing from the scope of the present invention.

We claim:

1. A method for downshifting of an automatic transmission of a vehicle according to an increase of throttle opening, comprising the steps of:
   a first step of judging a requirement of downshifting of the automatic transmission for a first time judgment starting time count for a delay time upon said judgement; calculating a value for said delay time based upon change rate of throttle opening;
   a second step of judging a requirement of downshifting of the automatic transmission for a second time judgment upon the count up of said delay time; and executing the downshifting according to an existence of the requirement of downshifting by the second time judgement.

2. A method for downshifting of an automatic transmission according to claim 1, wherein said delay time is calculated based upon a time span which would lapse for the throttle opening to increase up to a value for which a requirement of downshifting of the transmission for two speed stages is judged, provided that the throttle opening increases linearly.

3. A method for downshifting of an automatic transmission according to claim 2, wherein said delay time is modified for an increase when the change rate of throttle opening becomes negative before the delay time is count up.

4. A method for downshifting of an automatic transmission according to claim 1, wherein said automatic transmission comprises first and second speed change gear units connected in series, said first and second speed change gear units selectively providing high and low gear stages thereof, respectively, so that a first speed stage is provided by a series combination of the high gear stage of said first speed change gear unit and the high gear stage of said second speed change gear unit, a second speed stage next lower than said first speed stage is provided by a series combinations of the low gear stage of said first speed change gear unit and the high gear stage of said second speed change gear unit, and a third speed stage next lower than said second speed stage is provided by a series combination of the high gear stage of said first speed change gear unit and the low gear stage of said second speed change gear unit.

* * * * *